Sept. 2, 1941.   P. E. SCHNEIDER   2,254,916
DIRECTION INDICATOR
Filed Aug. 31, 1938
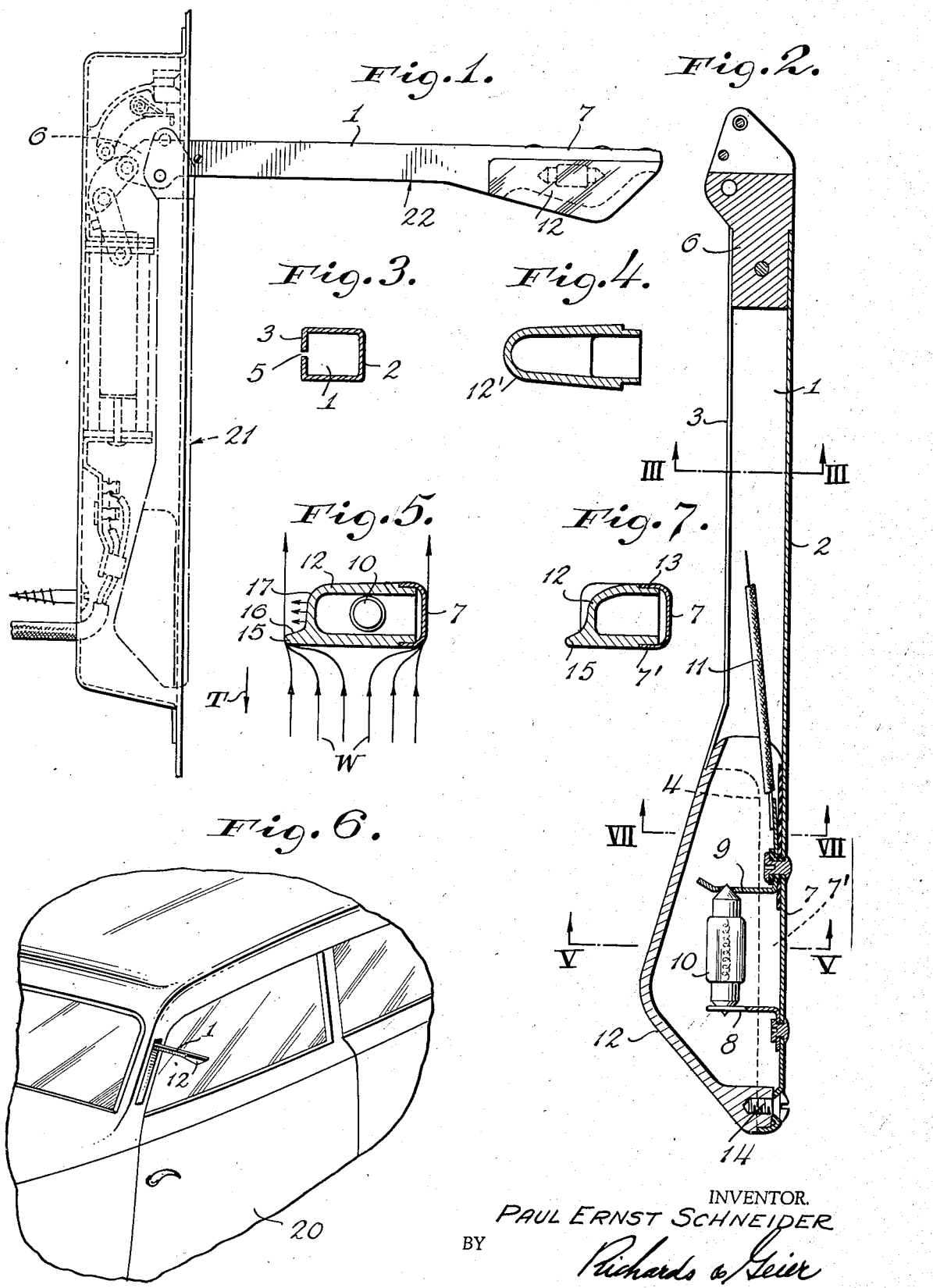
INVENTOR.
PAUL ERNST SCHNEIDER
BY
Richards & Geier
ATTORNEYS Patented Sept. 2, 1941

2,254,916

UNITED STATES PATENT OFFICE 2,254,916

DIRECTION INDICATOR

Paul Ernst Schneider, Chemnitz, Germany

Application August 31, 1938, Serial No. 227,673
In Germany September 3, 1937

2 Claims. (Cl. 177—329)

The invention relates to direction indicators, in particular for motor vehicles. The principal object of the invention is to provide an improved form of indicator comprising a narrow indicating arm widening towards its free end, and in the form of a closed casing preferably rectangular in cross section, made from an opaque material, for example, sheet metal. The invention is distinguished from indicating arms which consist of a metal frame having transparent discs of Celluloid or the like inserted therein, or are made in one piece or are longitudinally divided or comprise a transparent casing of artificial moulding material. The invention is also to be distinguished from indicating arms wherein the casing is of opaque material, for example, sheet metal, provided with windows of transparent material.

The main object of the invention is to obviate the fundamental disadvantage which is present in indicator casings hitherto constructed, namely, that they form with a loosely inserted Celluloid disc a readily deformable indicating arm in which changing of the illuminating lamp can only be carried out with difficulty. The indicating arms made of artificial moulding material, for example, have mainly the defect of little strength relatively to air resistances such as occur at high speeds of motor vehicles. Indicating arms of artificial moulding material made so that the supporting arm and other metal parts are moulded in at the same time, are subject to cracks and flaws, thereby rendering them particularly weak so that when damaged they must be replaced entirely.

Indicating arms are known made of opaque material and comprise mainly closed casings pressed out of sheet metal to rectangular or other shape, at the free end of which is secured, by means of a number of screws, a sheet metal cap having windows. The windows are closed by transparent discs. Indicating arms constructed in this way have inter alia the disadvantage that they are costly to manufacture and changing of the illuminating lamp is troublesome.

An indicating arm casing pressed in one piece from sheet metal to U-shape in cross section is also known. This casing is, however, open along the whole of its lower side, and provided with windows at its free end which are covered inside by transparent material similarly shaped to the cross section of the casing. Indicating arms of this kind have an illuminating lamp which is openly disposed, whereby the further disadvantage arises that dust, rain and snow can penetrate inside the arm. Further they have the disadvantage that by reason of their construction as an open shell they can be brought, even at average speeds of a motor vehicle, into the indicating position by an air current alone and even though the operating mechanism of the indicator has not been energized; or after they have been used they do not fall back again into the inoperative position.

The primary purpose of the present invention is to avoid all the foregoing objections and construct an indicating arm which is distinguished by great strength, by a particularly simple and cheap construction, and by an easy method of changing the illuminating lamp. To this end the invention consists in manufacturing the casing of an indicating arm of tubular form from sheet metal having at its free end a recess or cut away portion, which is completed by a detachable cap enclosing the lamp of the indicating arm, the cap being made from transparent material such as an artificial moulding material. In this way an indicating arm of the kind which is intensely illuminated for a certain length only at its free end is obtained in a simple manner, so that after the arm has been moved to indicating position at a certain distance from the body of the vehicle a luminous sign is obtained which cannot be confused with others, an advantage when the invention is applied to indicating arms of the so-called pendulum type.

In the drawing:

Fig. 1 is a side elevation of the direction-indicating arm;

Fig. 2 is a longitudinal section;

Fig. 3 is a cross-section taken on line III—III of Fig. 2;

Fig. 4 is a cross-section through a transparent cap having a comparatively blunt edge;

Fig. 5 is a cross-section along the line V—V of Fig. 2; showing a modified form of the transparent cap;

Fig. 6 is a fractional side view of a vehicle provided with the indicating arm; and Fig. 7 is a cross-section taken on line VII—VII of Fig. 2.

In the constructional examples shown in the drawing the indicating arm consists of a metal casing 1 which is stamped and pressed in one operation, including all apertures, from sheet metal, to approximately rectangular cross-section having a flat upper surface 2 in the longitudinal direction and a lower surface 3 extending parallel to surface 2 over the greater part of the length of the casing. Towards the end of the arm the casing curves away downwardly for the purpose of widening the casing, which terminates in an extension 7.

In relation to the outer shape of a usual indicating arm of this kind the indicating arm casing of the invention has as it were a cut-out part or recess 4, beginning from a point adjacent the end of the narrow part of the casing, and extending in a longitudinal direction to the point thereof, and having a depth which ends close to the upper surface 2. The pressing operation is moreover so effected that the side edges of the stamped out sheet stop short of one another in the longitudinal centre of the lower surface 3 of the casing, so that a narrow longitudinal slit 5 occurs which can be easily completely or partially closed by soldering or welding.

One end of the indicating arm casing 1 is secured in the usual way to the movable bearing part 6 of the drive for the arm. At the other, free, end, the casing extension 7, formed by the recess 4, is formed by the upper casing surface 2 and downwardly drawn edges 7', and is provided on its inner side with parts 8 and 9 for holding a lamp 10 and for securing the cable 11. The edges 7' of the extension 7 engage the edges 13 of a transparent cap 12 which is preferably made of artificial resin material and completes the indicating arm into the usual closed shape covering the source of light. The edges 13 of the cap 12 are reduced or shouldered in conformity with the thickness of the edges 7' so that a smooth outer surface is formed between the casing 1 and the extension 7 and cap 12, whereby the cap 12, by reason of its construction as an insertable part, can be secured merely by a screw 14 to the head of the indicating arm.

In Figure 6, 20 indicates a vehicle, while Figure 1 shows the indicator in its normal inoperative position 21 and its operative position 22.

The principle of reducing the disturbing influence of strong air resistance on the lower surface of an indicating arm against its return swing into the inoperative position is already known per se. In one case, to this end, the front surface of the indicating arm has been provided centrally with a strip of sheet metal projecting beyond the inner surface of the indicating arm and in another case the indicating arm has been provided centrally with rearwardly chamfered lower surface.

In accordance with the present invention the principle is made use of in order to provide an indicating arm which is particularly applicable as a "pendulum indicator;" such indicators require intense illumination only of the front part of the indicating arm which makes the maximum pendulum deflection, so that even at the high speeds of motor vehicles attainable, for example, on speed highways, a positive oscillation and return swing of the indicating arm into its inoperative position free from interference at the high air resistance is desirable. While the cap 12' in Fig. 4 has a blunt edge, in the construction of cap according to Figs. 5 and 7 the knowledge is utilised that strong air resistance can best be met by a knife-like construction of the lower surface of the free end of the indicating arm because the air resistance at the point acts on the largest area of the indicator arm. The cap 12, therefore, is moulded during its construction in such a manner that, looking in the direction of travel, its front side has a downwardly extending rib 15. The rib 15 extends from the insertion end of the cap up to the point thereof and merges (as shown in cross-section in Figs. 5 and 7) at its rear side into a hollow, or channel, 16, into which the rear side of the cap 12 merges with a rounded surface 17 so that a lower knifelike surface is obtained, which assists the downward movement of the indicating arm. Figure 5 shows the direction of the wind forces W acting against the front surface of the indicator when the same is travelling forward in the direction T.

What I claim and desire to secure by Letters Patent is:

1. A direction indicator, comprising, in combination, an elongated arm of rectangular cross-section throughout the major part of its length, said arm being stamped from sheet metal and having an upper wall, two side surfaces and opposed edges constituting a lower surface of the arm and extending at a distance from each other, one end of the arm including said upper wall and substantially short flanges constituting a part of said side surfaces, whereby a recess is formed at said end of the arm, a detachable translucent end portion fitting into said recess and having shoulders engaging said flanges to present flush surfaces, said end portion being U-shaped in cross-section and having slanting lower surfaces converging to an apex intermediate the ends of the end portion, a pair of brackets carried by said upper portion and projecting within said end portion to support a lamp therein, and a screw extending through said upper wall and engaging said end portion to hold the latter.

2. A direction indicator, comprising, in combination, an elongated arm of rectangular cross-section throughout the major part of its length, said arm being stamped from sheet metal and having an upper wall, two side surfaces and opposed edges constituting a lower surface of the arm and extending at a distance from each other, one end of the arm including said upper wall and substantially short flanges constituting a part of said side surfaces, whereby a recess is formed at said end of the arm, a detachable translucent end portion fitting into said recess and having shoulders engaging said flanges to present flush surfaces, said end portion being U-shaped in cross-section and having slanting lower surfaces converging to an apex intermediate the ends of the end portion, the lower surfaces of said end portion having a projecting knife-like extension adjacent to one of the side surfaces, a pair of brackets carried by said upper portion and projecting within said end portion to support a lamp therein, and a screw extending through said upper wall and engaging said end portion to hold the latter.

PAUL ERNST SCHNEIDER.